(12) United States Patent  
Covic et al.

(10) Patent No.: US 9,666,358 B2  
(45) Date of Patent: May 30, 2017

(54) INDUCTIVE POWER TRANSFER PICK UP CIRCUITS

(75) Inventors: Grant Anthony Covic, Auckland (NZ); Daniel James Robertson, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 980 days.

(21) Appl. No.: 13/820,477

(22) PCT Filed: Sep. 5, 2011

(86) PCT No.: PCT/NZ2011/000181  
§ 371 (c)(1),  
(2), (4) Date: Oct. 17, 2013

(87) PCT Pub. No.: WO2012/030238  
PCT Pub. Date: Mar. 8, 2012

(65) Prior Publication Data  
US 2014/0035382 A1 Feb. 6, 2014

(30) Foreign Application Priority Data  
Sep. 3, 2010 (NZ) ......................... 587780

(51) Int. Cl.  
*H01F 27/42* (2006.01)  
*H01F 38/14* (2006.01)  
*H02J 5/00* (2016.01)

(52) U.S. Cl.  
CPC .............. *H01F 38/14* (2013.01); *H02J 5/005* (2013.01)

(58) Field of Classification Search  
CPC .................. H02J 5/005; H01F 38/14

USPC ......................................... 307/104  
See application file for complete search history.

(56) References Cited

U.S. PATENT DOCUMENTS

| | | | |
|---|---|---|---|
| 5,293,308 A * | 3/1994 | Boys | H02J 5/005 324/392 |
| 8,093,758 B2 | 1/2012 | Hussmann et al. | |
| 8,941,266 B2 | 1/2015 | Boys | |
| 9,125,242 B2 * | 9/2015 | Budgett | A61M 1/127 |
| 2007/0109708 A1 | 5/2007 | Hussman et al. | |

(Continued)

FOREIGN PATENT DOCUMENTS

| | | |
|---|---|---|
| CN | 101490943 | 7/2009 |
| EP | 1693945 | 8/2006 |
| JP | 7-239185 | 9/1995 |

(Continued)

OTHER PUBLICATIONS

Computer generated English Translation of JP 2000-125487.  
Computer generated English Translation of JP 7-239185.

*Primary Examiner* — Jared Fureman  
*Assistant Examiner* — Duc M Pham  
(74) *Attorney, Agent, or Firm* — Law Office of Richard F. Jaworksi, PC

(57) ABSTRACT

An inductive power transfer (IPT) pick-up circuit for receiving power from a primary conductor has a pick-up coil (L2) and a compensation capacitor (C2) so that the pick-up coil (L2) may be resonant at the system operating frequency a switch (S1, S2), and a plurality of reactive elements (L3, C3) whereby when the switch is in one of an on state or an off state the additional reactive elements (L3, C3) are resonant at the operating frequency to reduce power being supplied to an output of the pick-up circuit.

16 Claims, 13 Drawing Sheets

(56) References Cited

U.S. PATENT DOCUMENTS

2010/0171368 A1   7/2010   Schatz et al.

FOREIGN PATENT DOCUMENTS

| JP | 2000-125487 | 4/2000 |
|----|-------------|--------|
| JP | 2007-501600 | 1/2007 |
| WO | 2005-041389 | 5/2005 |
| WO | WO2009091267 | 7/2009 |
| WO | WO2010030195 | 3/2010 |
| WO | WO2011046453 | 4/2011 |

* cited by examiner (a)

(b)

(c)

(a)

(b)

INDUCTIVE POWER TRANSFER PICK UP CIRCUITS

REFERENCE TO RELATED APPLICATIONS

The present disclosure is based on and claims benefit from International Application Number PCT/NZ2011/000181 filed on Sep. 5, 2011 which claims benefit from New Zealand application 587780 filed Sep. 3, 2010, the entire contents of each of which are herein incorporated by reference.

FIELD OF THE INVENTION

This invention relates to inductive power transfer (IPT) systems.

BACKGROUND

IPT pick-up circuits may process alternating current (AC) to provide power to a load. As the power and voltage output requirements of AC processing circuits suitable for IPT applications such as lighting rises, so does the strain on the AC switch used to regulate the power. In the standard AC processing pickup described in patent publication WO 2010/030195A1, the VA product which the switch must be rated for rises approximately in proportion to the square of the load dependent quality factor (i.e. $Q_2^2$). The power capacity of the pickup, however, only rises in proportion to $Q_2$. Thus to achieve large power outputs and relatively high circuit Q, a modified controller is required.

The switch and current ratings in the parallel tuned AC controller circuits described in WO 2010/030195 have ratings that depend on the topology and the amount of tuning required to drive the load. In very high power applications the switch rating can be prohibitive and expensive. For example, the parallel AC processing pickup circuit of FIG. 1 must be rated to handle the peak resonant inductor current along with the peak load voltage, $\hat{V}_o$, while the switches in the series tuned version of an AC processing pickup circuit such as that shown in FIG. 2 must be rated to handle the peak resonant inductor voltage, along with the peak load current, $\hat{I}_o$.

If a DC output voltage is required to be derived from the parallel tuned circuit of FIG. 1 the peaks of the AC voltage input to the rectifier (not shown) must be 157% of the output DC voltage. The same is true for the current in series tuned circuit of FIG. 2 when a DC output is required. As the circuit Q, output power, and output voltage increase, the limitations of the available switch technology become increasingly difficult to design around with both standard parallel and series tuned AC processing topologies.

In the parallel tuned, AC Processing pickup described in WO 2010/030195A1, the AC switch is directly in parallel with the resonant inductor and must therefore be rated to survive the peak resonant inductor current and peak load voltage. Therefore, assuming that the circuit is designed to run such that the $Q_{operational}=Q_2$, the $V_{sw} \cdot I_{sw}$ or VA product which the switch must be rated for is $\sqrt{2}V_{oc}Q_2 \cdot \sqrt{2}I_{sc}\sqrt{Q_2^2+1}$, which is slightly above $2V_{oc}I_{sc}Q_z^2$. However, the purpose of the AC switch is to control the circuit Q. If more than $I_{sc}$ is allowed to flow through the switch in parallel with the AC load, the circuit Q falls. If less than $I_{sc}$ is allowed to flow through the switch in parallel with the AC load, the circuit Q rises. As such, the minimum VA rating of the switch must be at least the short circuit current, multiplied by the pickup's maximum output voltage ($I_{sc}Q_2V_{oc}$). Therefore, the VA rating of both the switches is <$2Q_2$ times the minimum switch rating required for power control.

It would be advantageous to provide a circuit topology for which the required peak switch voltage and current ratings can be reduced.

OBJECT OF THE INVENTION

It is an object of the present invention to provide apparatus or methods in connection for pick-up circuits in connection with pick-up circuits for IPT systems which reduce switch stresses. Alternatively, it is an object of the present invention to at least provide a useful alternative to known apparatus or methods.

SUMMARY OF THE INVENTION

In one aspect the invention provides an inductive power transfer (IPT) pick-up circuit for receiving power from a primary conductor at a selected operating frequency, the circuit having:

a pick-up coil and a compensation capacitor;

a switch means controllable between an operable state and an inoperable state;

a plurality of additional reactive elements whereby when the switch means is in one of the operable or inoperable states the additional reactive elements are resonant at the selected operating frequency to substantially reduce or prevent power being supplied to an output of the pick-up circuit.

Preferably the switch means is in the other of the operable or inoperable states power is supplied to the load. Preferably the switch means is in the other of the operable or inoperable states the pick-up coil and compensation capacitor become resonant.

Preferably, when the switch means is in the other of the operable or inoperable states the pick-up coil, compensation capacitor and at least one of the plurality of reactive elements are together resonant.

In one embodiment the pick-up coil and compensation capacitor are connected in parallel.

Preferably the output is provided in parallel with the compensation capacitor.

Preferably the plurality of additional reactive components comprise a capacitor and inductor connected in series.

Preferably the series connected capacitor and inductor are connected in parallel with the pick-up coil and compensation capacitor.

Preferably the switch means is connected in parallel with the capacitor. Preferably the output includes a rectifier to provide a DC power supply.

In one embodiment the pick-up coil and compensation capacitor are arranged in series. Preferably the output is provided in series with the compensation capacitor.

Preferably the plurality of additional reactive components comprise a capacitor and inductor connected in parallel. Preferably the parallel connected capacitor and inductor are connected in series with the pick-up coil and compensation capacitor.

Preferably the switch means is connected in series with the inductor. Preferably an additional compensation capacitor is connected in parallel with the inductor to reduce a peak switch voltage.

Preferably the output includes a rectifier to provide a DC power supply.

In a further aspect the invention provides an IPT system including a pick-up circuit according to any one of the preceding statements.

In a further aspect the invention provides a method in controlling an inductive power transfer (IPT) pick-up circuit having a pick-up coil and a compensation capacitor, the method including the steps of operating a switch means to cause one or more additional reactive components to become resonant to thereby control the power supply to a load.

Preferably the method includes disposing the switch means in one of an operable or inoperable state to cause the reactive elements to be resonant to substantially prevent power being supplied to an output of the pick-up circuit.

Preferably the method includes disposing the switch means in the other of the operable or inoperable states to cause power to the load.

Preferably the method includes disposing the switch means in the other of the operable or inoperable states to cause the pick-up coil and compensation capacitor to become resonant to supply power to the load.

In another aspect the invention provides an inductive power transfer (IPT) pick-up circuit for receiving power from a primary conductor at a selected operating frequency, the circuit having:
a pick-up coil;
a tuning capacitor connected in series with the pick-up coil;
a switch means controllable between an operable state and an inoperable state to control the transfer of power to the pick-up circuit;
a compensation capacitor connected in parallel with the pick-up coil to reduce a peak switch voltage.

Preferably the compensation capacitor is non-resonant with the pick-up coil at the operation frequency when the switch is in the inoperable state. Preferably the switch means is connected in series with the pick-up coil.

Preferably a load supplied by the pick-up circuit is connected in series with the pick-up coil.

Further aspects of the invention will become apparent from the following description.

BRIEF DESCRIPTION OF THE DRAWINGS

One or more examples of the invention will be discussed below with reference to the accompanying drawings in which.

The diagrams shown in FIGS. 5-11, 14 and 15 have been derived from a fundamental model view of the circuits to which they relate. As such, the waveforms may be slightly different in practical circuits which are likely to experience harmonics from switching transients.

DESCRIPTION OF ONE OR MORE
EMBODIMENTS OF THE INVENTION

Two new controller topologies are proposed herein which lower switch stress. One is applicable for the parallel tuned cases of the AC Processing Controller described in WO 2010/030195A1. The other is applicable to series tuned circuits such as that of FIG. 2 which is described in WO 2011/046453. When applied to meet realistic IPT system requirements with a resonant tuning factor of $Q_2=5$, the new topologies result in switch VA ratings falling by up to 3.8 times compared to the traditional AC processing regulators. Under the proposed topologies, switch blocking voltages are controllable by the designer, independent of the required output voltage. For $Q_2$ values above 5, the relative switch stress will fall further.

The AC output voltage from the proposed parallel and series resonant controllers are also sinusoidal, unlike in the AC pickup of WO 2010/030195A1 and WO 2011/046453. As such, RFI and harmonic distortion across the load will also reduce.

Figure 2:
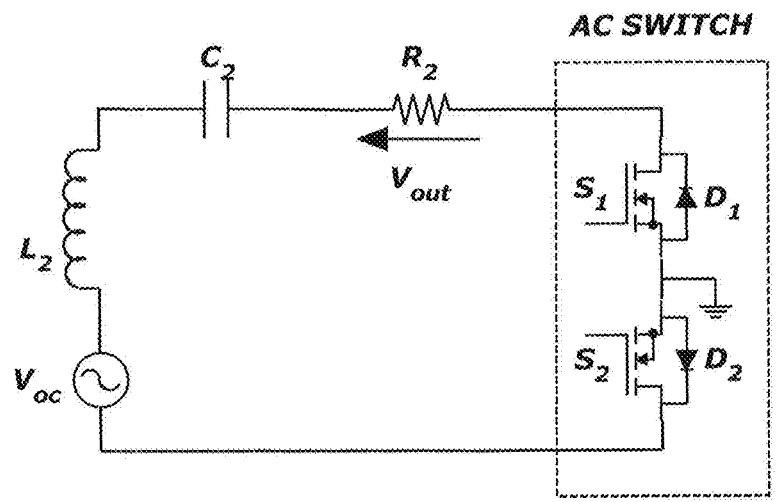
FIG. 2: is a circuit diagram of a known series tuned IPT pick-up circuit.

The proposed parallel tuned resonant controller operates at zero output power when the AC switch is off, whereas the proposed series tuned resonant controller operates at maximum power when the AC switch is off, which in this topology improves its efficiency over that of FIG. 2.

Both topologies can be configured to enable a controlled DC output, although the new series-tuned resonant controller naturally results in a smaller and more cost effective DC output pickup design than is possible with the standard parallel tuned pickup for lower voltage DC output because a DC inductor is not required.

A Modified AC Controlled Parallel-Tuned Resonant Controller

Figure 3:
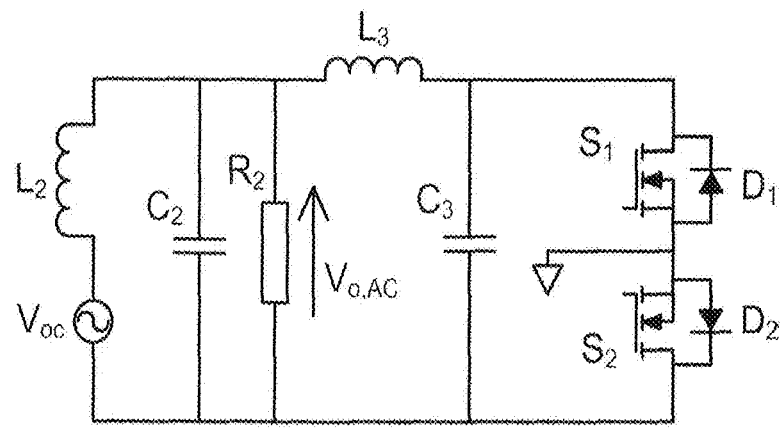
FIG. 3: is a circuit diagram of an improved parallel tuned IPT pick-up circuit.

To regulate the proposed pickup circuit's output power using practical switches with the lowest loss, variations on the previously discussed AC processing circuits are herein proposed which do not expose the switch to such high voltages and currents. One example of such a circuit, applicable to parallel tuned pickup coils, is shown in FIG. 3. Those skilled in the art will understand that there are potentially many different arrangements which reduce switch stress but only one example is discussed here so that the concepts may be clearly understood and will be referred to in the remainder of this document as the "parallel tuned, resonant controller". This controller is based upon the AC switch, composed of $S_1$, $S_2$, $D_1$ and $D_2$ in FIG. 3, and uses the method of clamping the resonant capacitor ($C_3$ in this case) to change the impedance of the adjacent inductor-capacitor pair ($L_3$ and $C_3$) as described in WO 20101030195A1.

The following description explains how the circuit of FIG. 3 functions. Here $L_2$ is a pickup inductor which is loosely coupled to an IPT primary conductor such as a track (not shown) operating at a frequency in the VLF to LF range (typically 10-140 kHz for medium to high power applications). The pickup inductor $L_2$ is tuned to resonate at the track frequency using compensation capacitor $C_2$ and $L_3$ as described further below, so that when $L_2$ is resonant, power is transferred from the primary conductor to the pick-up circuit.

If $L_3$ and $C_3$ in FIG. 3 are additional reactive elements that are tuned to resonance at the track frequency, it can be seen that, when the AC switch is left as an open circuit, $L_3$ and $C_3$ will resonate and form a short circuit across the pickup inductor $L_2$. If this effective short circuit occurs, the power delivered to the load ($R_2$) will be zero. If the compensation capacitor $C_2$ in FIG. 3 is chosen such that it resonates with the combined parallel impedance of $L_2$ and $L_3$ at the track frequency it can be observed that, if the AC switch is short circuited, the combined reactance of $L_3$, $C_3$ and the AC switch, as seen by the parallel resonant tank, will simply be $X_{L3}$ (i.e. the reactance of Thus, the power delivered to the load will be at maximum because the combined parallel impedance of $C_2$, $L_2$ and $L_3$ is resonant at the track frequency. Therefore, when the AC switch is in an operable (i.e. closed) state, power is supplied to the load. When the AC switch is in an inoperable (i.e. open) state, no power is transferred from the primary conductor, so power is not supplied to the load, or at least the supply of power to the load (i.e. the output) is substantially reduced or prevented.

Figure 4:
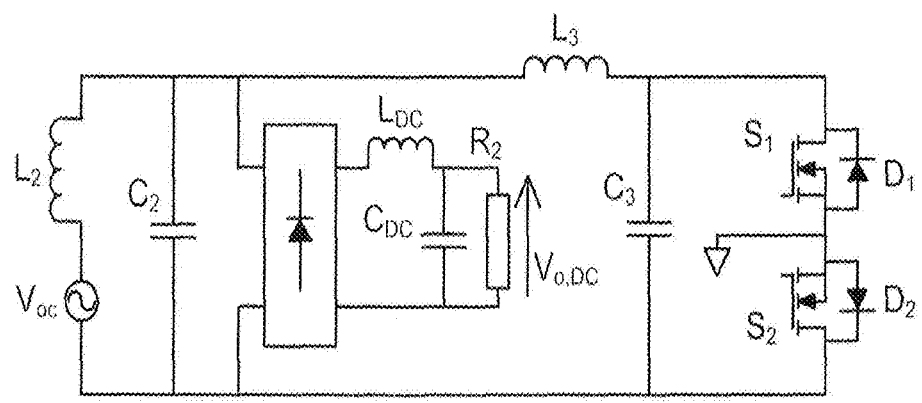
FIG. 4: is a diagram of the pick-up circuit of FIG. 3 with a DC output.

If a DC output is desired then the circuit can be modified to that shown in FIG. 4 by adding a rectifier across the tuning capacitor $C_2$ along with an output filter in the form of inductor $L_{DC}$ and $C_{DC}$.

Figure 5:
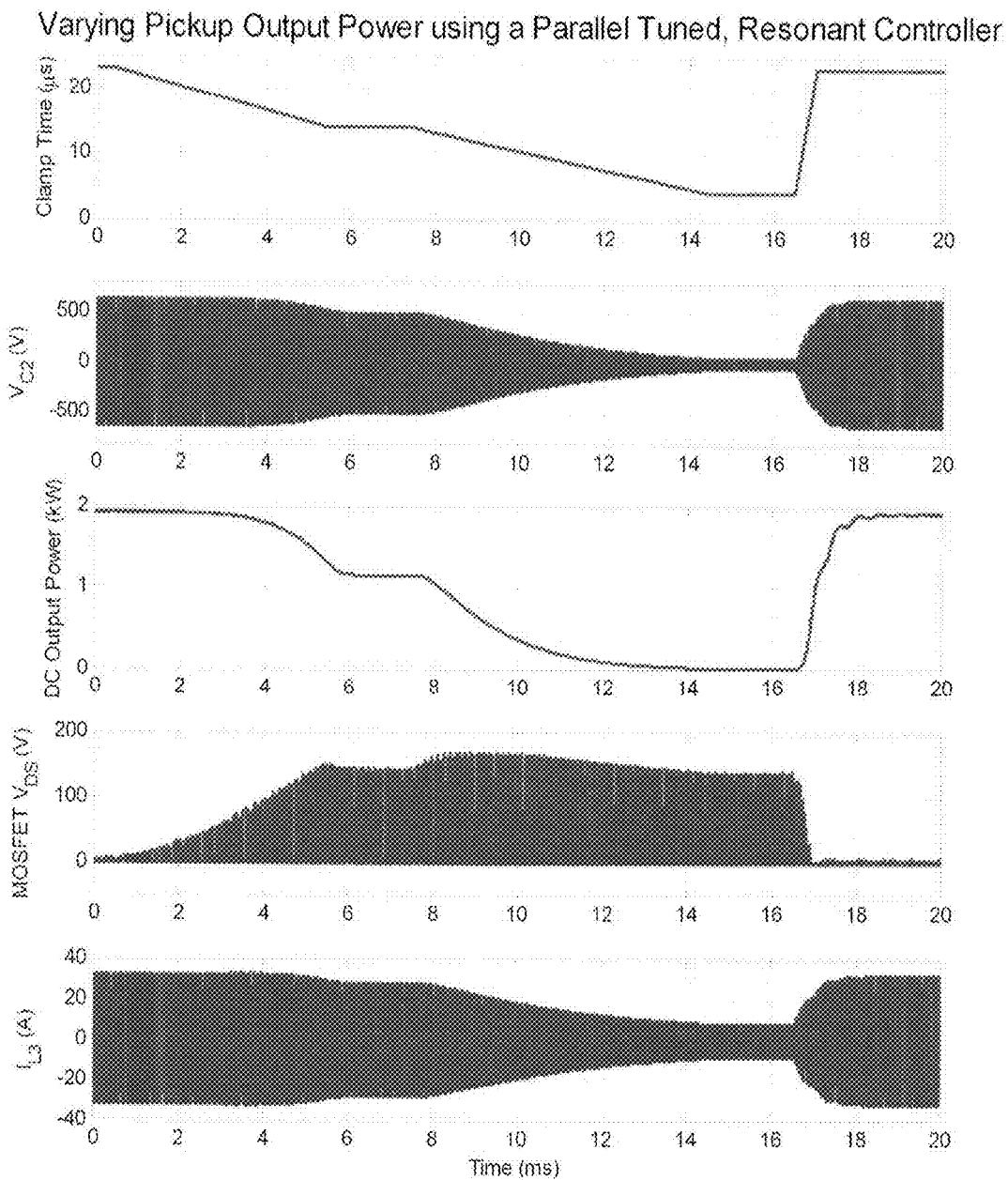
FIG. 5: Shows operating wave forms for the circuit of FIG. 4.

The simulated operation of the circuit of FIG. 4 is shown in FIG. 5, where the output power is varied by varying the time that each of the switches are on in each half cycle of the track frequency (T/2). This time for which the switches remain on is called the clamp time ($T_c$) which can theoretically vary from 0-T/2. In this simulation the track frequency is set to 20 kHz so that 25 μs represents a theoretical maximum clamp time. If the clamp time is zero there is no power delivered to the load, while with full clamp time the maximum power is available to the load. As shown in FIG. 5, $T_c$ is initially at a maximum and is slowly reduced to near zero and then ramped back to close to maximum, enabling power to be varied. Initially full power is output, after which the controller ramps down to half power, then ramps down to zero power, and then ramps back up to full power. While the output power can be increased rapidly without detriment, if the output power is decreased rapidly without control, high transient switch voltages will result. It should be noted that ramping the voltage with suitable slew rate eliminates this problem as shown in FIG. 5, and for the purposes of lighting control such a slew rate enables controlled reduction in light output much faster than would be possible with lighting controllers operating at 50 Hz mains frequency.

Figure 6:
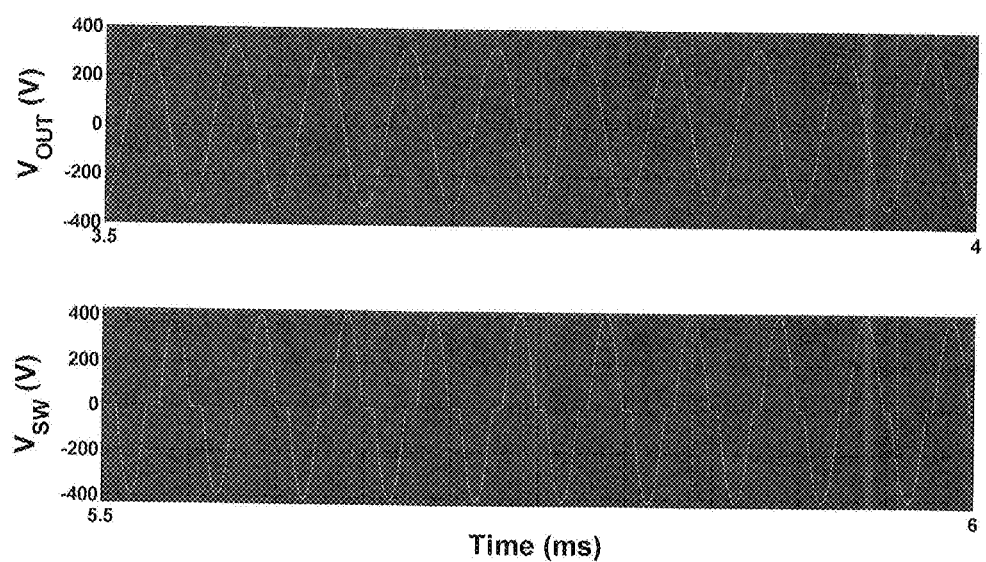
FIG. 6. Shows operating wave forms for the circuit of FIG. 3.
Figure 7:
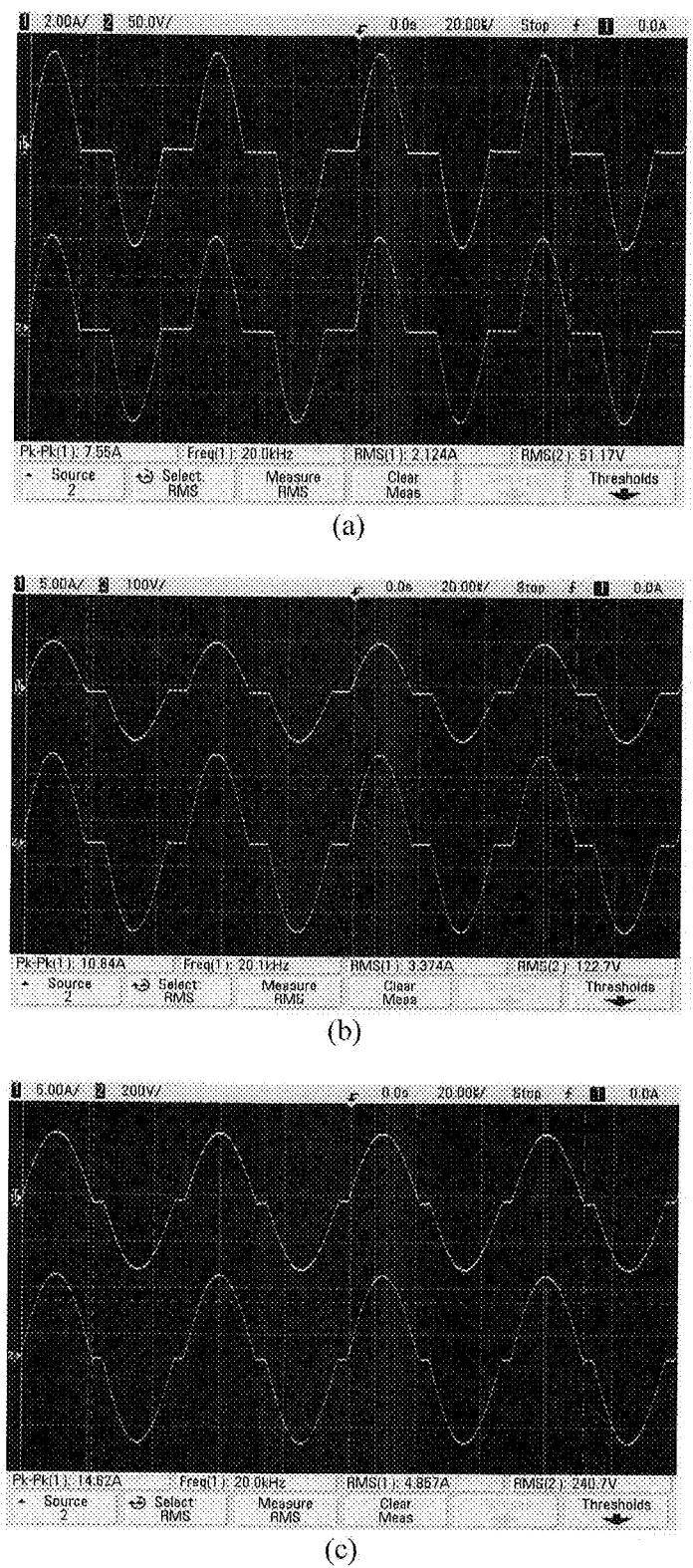
FIG. 7: Shows measured load current (upper trace) and voltage (lower trace) of a 1.2 kilowatt system according to FIG. 1 operating at three different controlled output voltage levels:
(a). 50 volts;
(b). 120 volts;
(c). 240 volts.
Figure 8:
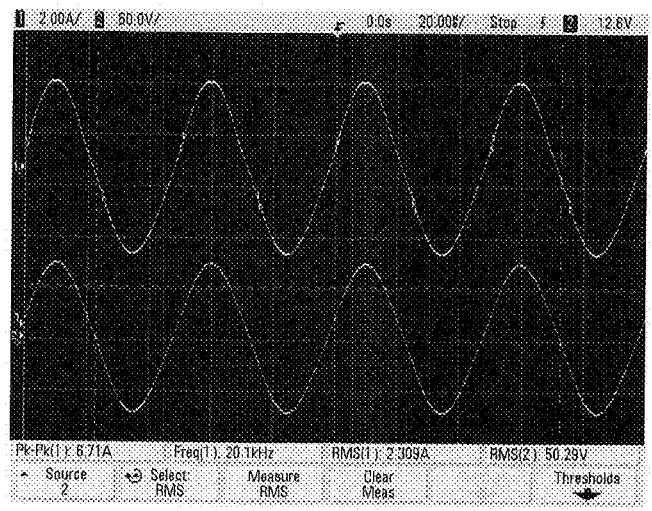
FIG. 8: Shows measured load current (upper trace) and voltage (lower trace) of a 1.2 kilowatt system according to FIG. 3 operating at three different controlled output voltage levels:
(a). 50 volts;
(b). 120 volts;
(c). 240 volts.
Figure 8:
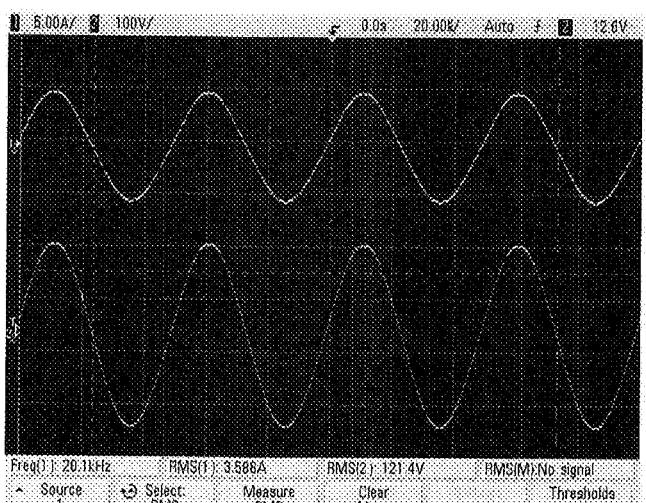
Figure 8:
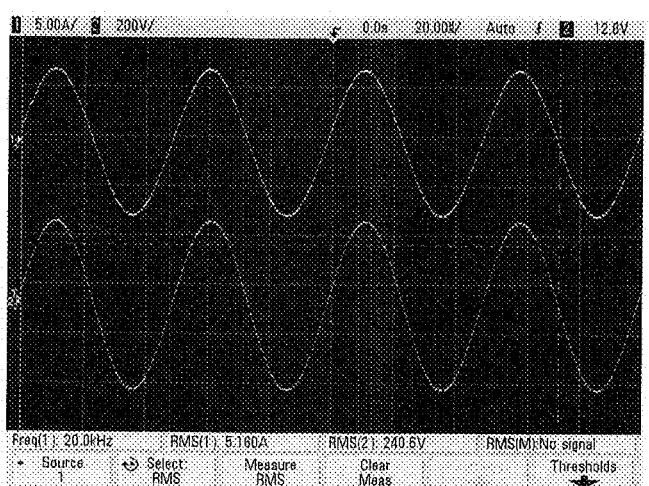

A particular advantage of the proposed parallel-tuned resonant controller is that it operates at zero output power when the switches are off, meaning that during the start up period when the IPT system is first turned on, the controller will have as much time as it requires to start-up, without the resonant voltage building up uncontrollably. It is also naturally safe if the controller fails, since it will naturally decouple the pickup when the switches are in the off state. Furthermore, the output voltage in the proposed parallel-tuned, resonant controller is perfectly sinusoidal, unlike in the standard parallel tuned AC Processing Controller of FIG. 1. This means peak load voltages are lower for a given RMS value and that RFI is reduced. FIG. 6 shows that the voltage across the load is sinusoidal, even though the voltage across the switches is distorted due to the clamping control. FIG. 7 and FIG. 8 show the difference in operation of known controller of FIG. 1 and the proposed controlled of FIG. 3 respectively driving a 1.2 kW Phillips 240 V stage light which is highly resistive operating from a common pickup that has a $V_{oc}$=85V and $I_{sc}$=6 A. As shown in FIG. 7, when operated from the circuit of FIG. 1 the switch voltage and output AC voltage are necessarily the same and there is notable distortion in the voltage and current due to the clamping action of the switch. FIG. 8 shows operation with identical output RMS voltages across this light under operation of the circuit of FIG. 3. As shown there is no noticeable distortion in either the voltage or current.

A practical drawback of the proposed parallel-tuned, resonant controller circuit, of FIG. 3, is the trade off between inductor $L_3$'s volume, denoted here as proportional to $G_{L_3}$, (where $G_{L_3}=L_3 I_{L_3}^2$) and the blocking voltage rating required of the switch. Consider the case where the circuit is delivering full output power. Due to the AC switch, $C_3$ is fully shorted, so the equivalent circuit consists of $L_2$, $L_3$, $C_2$ and $R_2$ in parallel. Therefore, $I_{L_3}=V_o/X_{L_3}=V_o/(\omega L_3)$. As such $G_{L_2}=V_o^2/(\omega^2 L_3)$ and given $V_o$ is load dependent while $\omega$ is typically fixed depending on the requirements of the IPT design (making both largely beyond the control of the designer), $G_{L_3}$ can be reduced by increasing $L_3$. However, as $L_3$ increases, simulation shows that $V_{c_3}$ (and therefore the switch voltage $V_{sw}$) also increases. The ratio of maximum $I_{L_3}$ to maximum $I_{L_2}$ can be chosen by design using the ratio:

$$K_L = (V_o / X_{L_3}) / (V_o / X_{L_2}) = L_2 / L_3.$$

Figure 9:
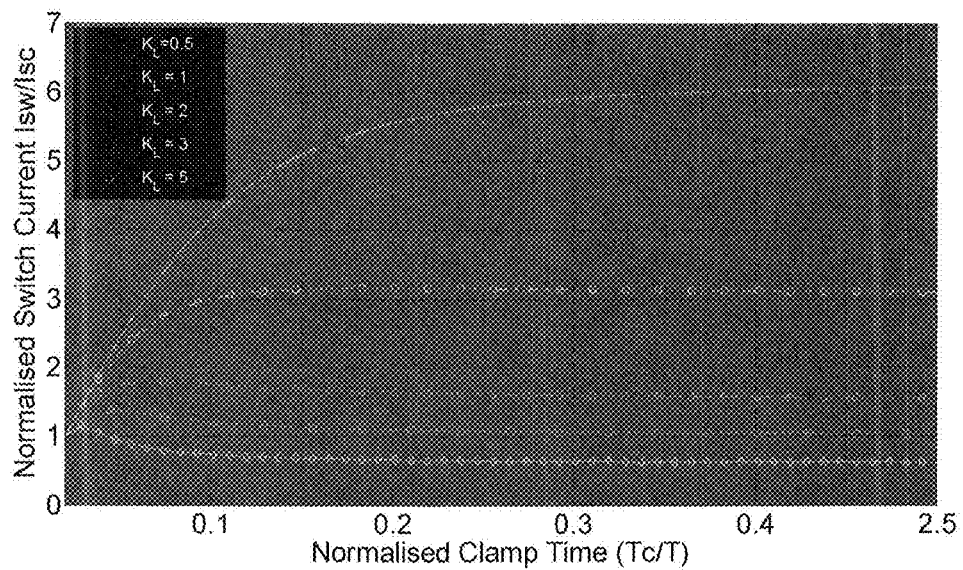
FIG. 9: Shows design of normalised switch current rating (relative to the pick-up short circuit current) by setting the circuit ratio $K_L = L_2/L_3$.
Figure 10:
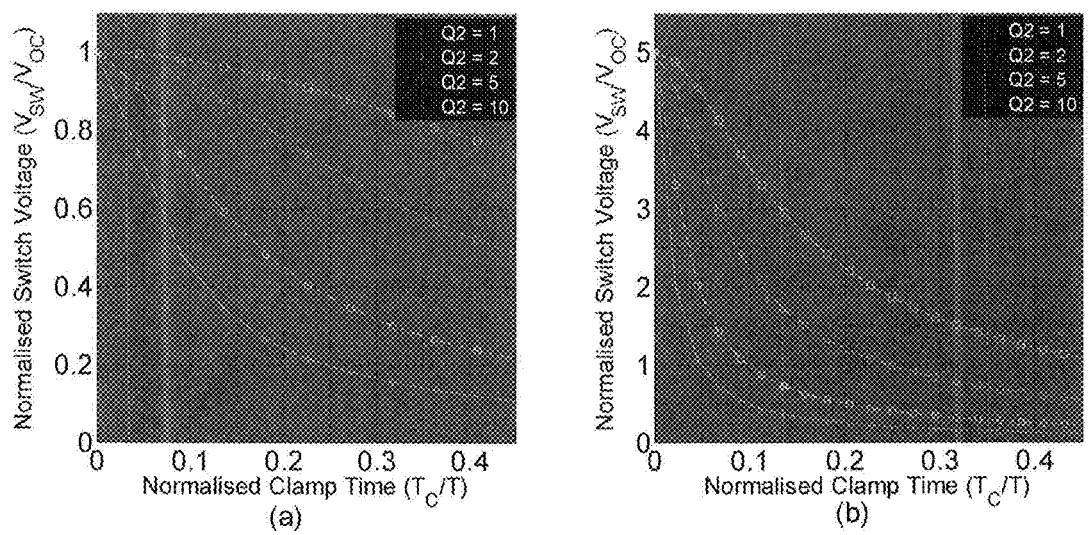
FIG. 10: Shows design of normalised switch voltage rating under various operating Q's (relative to the pick-up open circuit voltage) by setting the circuit ratio $K_L = L_2/L_3$. (a) $K_L = 1$, (b) $K_L = 5$.
Figure 11:
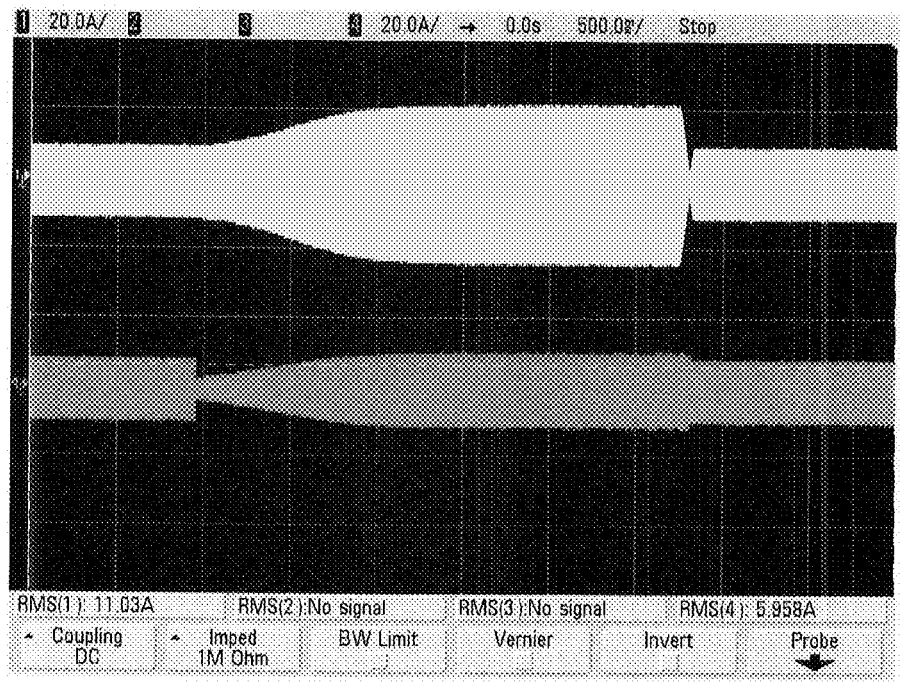
FIG. 11: Shows operating waveforms of the circuit of FIG. 3 with (a) $I_{L2}$ (upper trace) and $I_{L3}$ (lower trace), (b) output voltage (upper trace) and switch voltage (lower trace)
Figure 11:
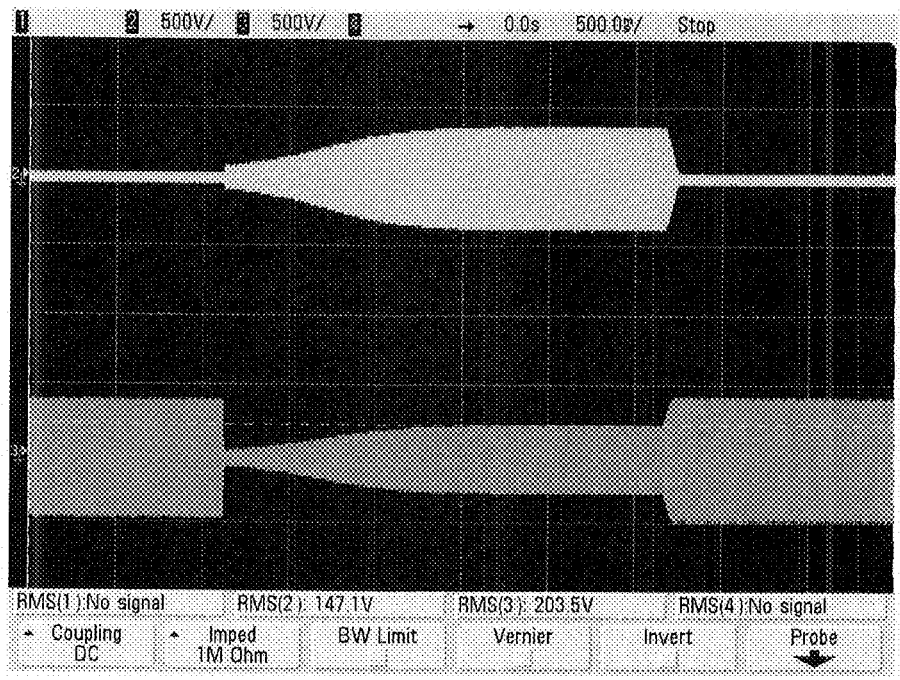

The impact that $K_L$ has on the switch current and voltage is shown in FIGS. 9 and 10 respectively. FIG. 9 shows the switch current rating normalised relative to the pick-up short circuit current for various values of $K_L$ at fixed Q. FIG. 10 shows the switch voltage rating normalised relative to the pick-up open circuit voltage for various values of Q. Here FIG. 10(a) has a $K_L=1$ whereas FIG. 10(b) has a value $K_L=5$. As shown the maximum steady state value is given (independent of operating Q) as $V_{sw}=K_L V_{oc}$, whereas from FIG. 9 where Q=3, it is shown that the steady state switch current $I_{sw}=(Q/K_L)I_{sc}$. As such $K_L$ is useful to ensure the switch voltage and current can be matched to suitably available switches for a given application. FIG. 11 shows controlled operation of this new circuit of FIG. 3 when $K_L=3 \sim Q_{2max}$, and it is providing controlled output to a 1.2 kW light. As expected the switch currents remain similar to $I_{sc}$.

By way of example, if a circuit based on the DC output topology of FIG. 4 was required and designed to meet the following parameters: f=20 kHz, $P_{sw}=V_{oc}I_{sc}=400$ VA, $P_o=2$ kW at 400V DC output, then assuming a known practical pick-up has an $L_2=157$ μH, $V_{oc}=88.9$V and $I_{sc}=4.5$ A, it can be calculated from these specifications that the required $Q_2=5$. If $L_3$ is set to equal to $L_2$, the $LI^2$ rating of $L_3$ will equal that of $L_2$. According to simulation, the peak switch voltage will then be ~166V, the peak switch current will be 32.5 A and the total VA rating of the switch is at least 5.4 kVA. Practical high power switches normally have better voltage blocking capability than current ratings, so a design that requires a low voltage but high current switch is undesirable. The switch blocking voltage ($V_{DS}$) and the resonant voltage across the pickup coil ($V_{C2}$) are shown in FIG. 4, at a variety of output power levels. The peak switch current is the same as the peak current flowing through $I_{L3}$. By changing the design so that $L_3=L_2Q_2$, the peak switch voltage changes to approximately the peak AC load voltage, which is what it would be in the traditional AC Processing pickup circuit of FIG. 1. However while the peak switch voltage has risen to 648V, the peak switch current falls to 8.6 A, and the volume of $L_3$ falls to 2.5 times less than that of $L_2$. The VA rating of the switch is now 5.6 kVA, similar to the last example.

Figure 1:
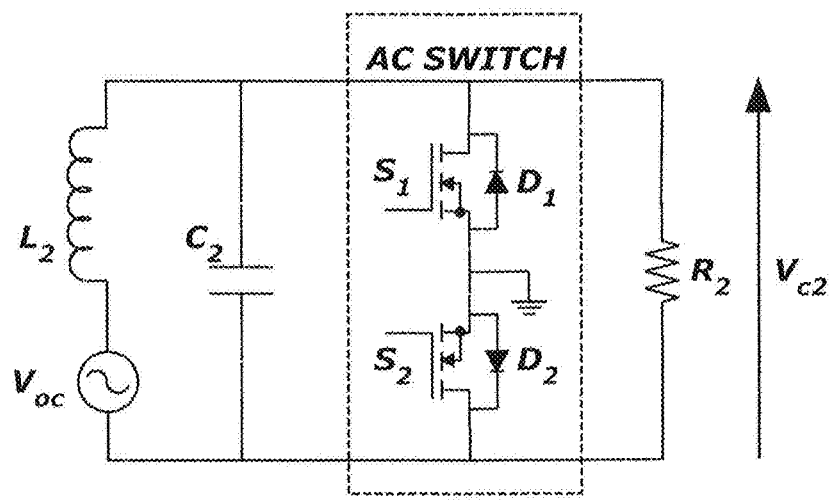
FIG. 1: is a circuit diagram of a known parallel tuned IPT pick-up circuit.

To meet the same parameters using the conventional parallel tuned, AC processing circuit of FIG. 1 requires a switch voltage rating of at least $\sqrt{2}\hat{V}_{c_2}=\sqrt{2}(\pi/2\sqrt{2})V_{DC}$ or 628V. The peak switch current rating would need to be $\sqrt{2}I_{sc}\sqrt{Q^2+1}$, or 32.4 A. Therefore, the total VA rating, of the switch must be at least 20.3 kVA, or approximately 3.8 times higher than when using the resonant controller of FIG. 4. Consequently, the VA rating of the switch for the newly proposed circuit has fallen significantly and the desired switch voltage can now be set independently of the output voltage by suitable choice of the inductor ratio: $K_L=L_2/L_2$.

A Modified AC Controlled Series Tuned Resonant Controller

The series tuned AC Processing controller shown in FIG. 2 as described in WO 2011/046453 can also be modified to reduce the peak switch voltage and current requirements. An example of such a modified controller is shown in FIG. 12, here referred to as a "series tuned, resonant controller".

Figure 12:
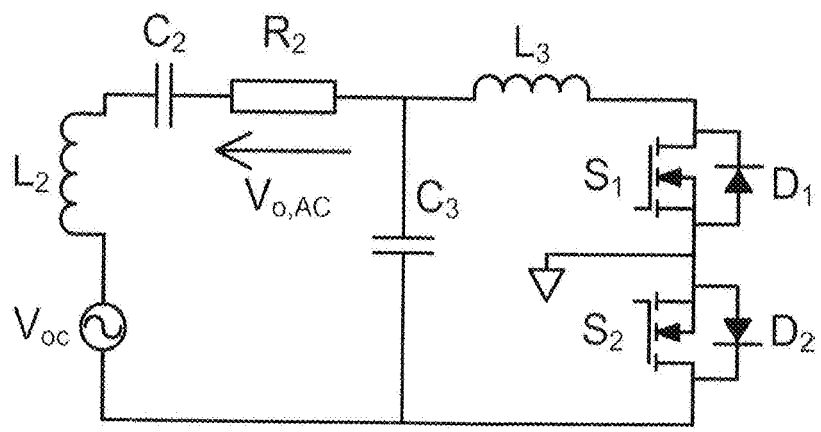
FIG. 12: Shows a circuit diagram of a new series tuned IPT pick-up circuit.

The following description explains how the circuit of FIG. 12 functions. Here $L_2$ is a pickup inductor which is loosely coupled to an IPT primary conductor such as a track (not shown) operating at a frequency in the VLF to LF range (typically 10-140 kHz for medium to high power applications). The pickup inductor $L_2$ is tuned to resonate at the track frequency using compensation capacitor $C_2$ and $C_3$ as described further below, so that when $L_2$ is resonant power is transferred from the primary conductor to the pick-up circuit.

Inductor $L_3$ and capacitor $C_3$ are additional reactive components. Suppose that inductor $L_3$ is chosen to resonate with $C_3$ at the track frequency. Consider the case where the AC switch, composed of $S_1$, $S_2$, $D_1$ and $D_2$, is on. Because $C_3$ and $L_3$ form a parallel resonant circuit at the track frequency, they will together appear as an open circuit to the rest of the circuit, thereby reducing the power delivered to the load to zero. Now suppose that capacitor $C_2$ is chosen such that it resonates at the track frequency when in series with capacitor $C_3$ and pickup inductor $L_2$. When the AC switch is off, the inductor $L_3$ will be disconnected from the rest of the circuit, and because $C_2$, $C_3$ and the pickup inductor $L_2$ are resonant at the track frequency, the power delivered to the load is at a maximum. Therefore, in this embodiment, when the AC switch is in an inoperable (i.e. open) state, power is supplied to the load. When the AC switch is in an operable (i.e. closed) state, no power is transferred from the primary conductor, so power is not supplied to the load, or at least the supply of power to the load (i.e. the output) is substantially reduced or prevented.

Figure 13:
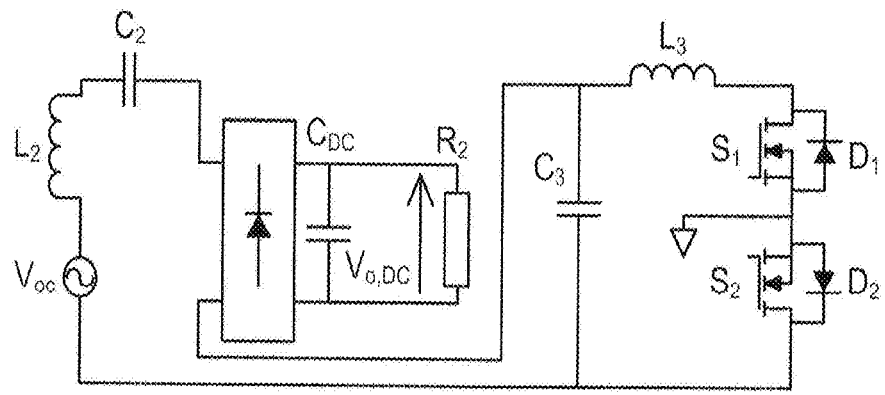
FIG. 13: Shows the circuit of FIG. 12 including a DC output.

As in the parallel tuned resonant controller proposed earlier, a DC output can be produced from this circuit, in this case by adding a rectifier followed by a DC capacitor in place of the AC load. Because this is a series tuned system the DC inductor is not required. This DC output arrangement is shown in FIG. 13.

A circuit based on the proposed series-tuned, resonant controller powering a 220V, 1200 W AC load can be designed and simulated. Because of the transiently high current required by tungsten-halogen incandescent lamps as they turn on, series tuned IPT pickups may be more applicable to driving these loads than parallel tuned circuits. However, because the peak switch voltage in the standard series tuned AC Processing pickup is $\sqrt{2}V_{cc}\sqrt{Q_2^2+1}$, the standard series tuned AC Processing topology of FIG. 2 is not particularly suited to applications where a high output voltage is required. The modified circuit of FIG. 12 however overcomes this problem.

Figure 14:
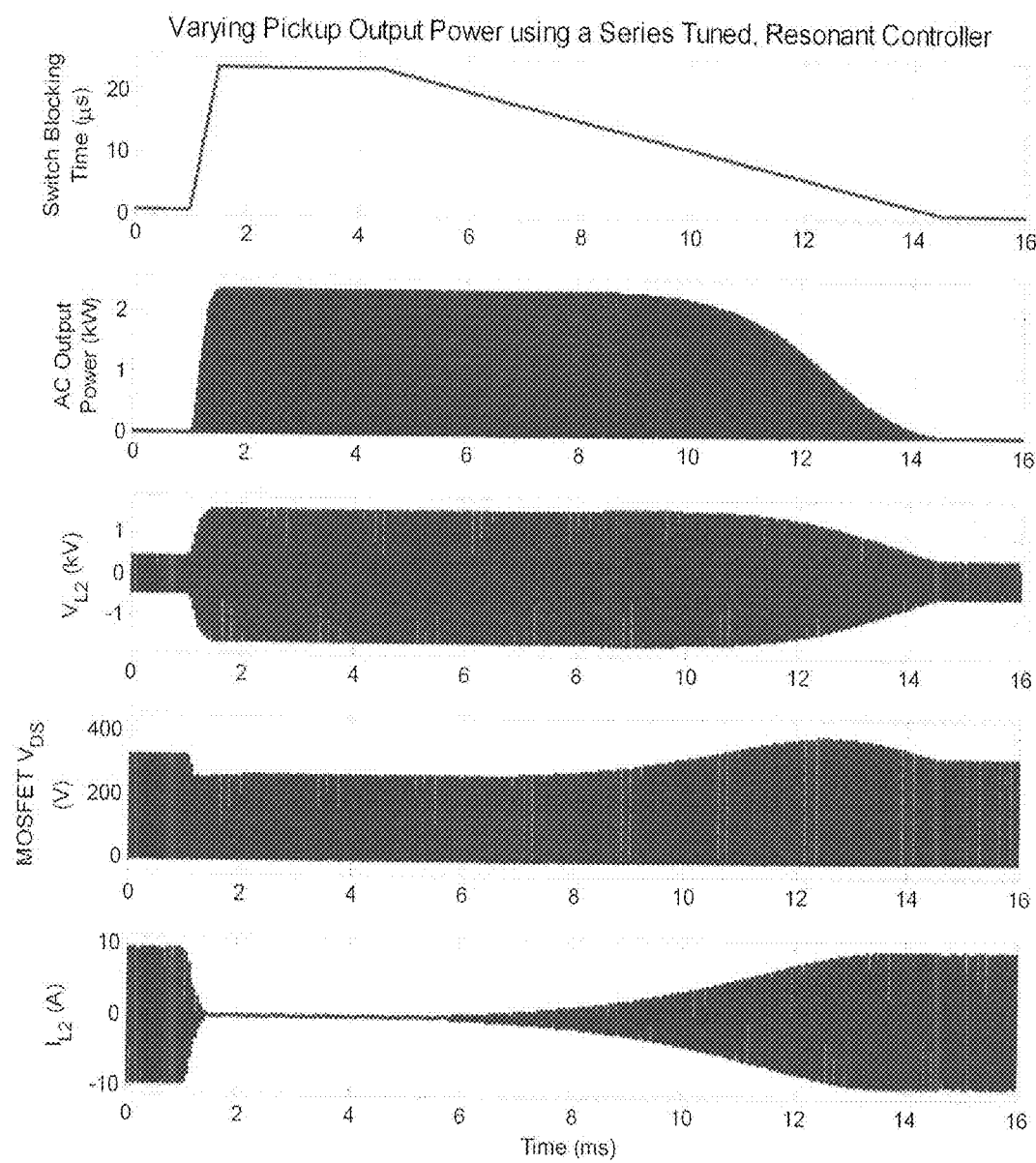
FIG. 14: Operating waveforms of the circuit of FIG. 12.
Figure 15:
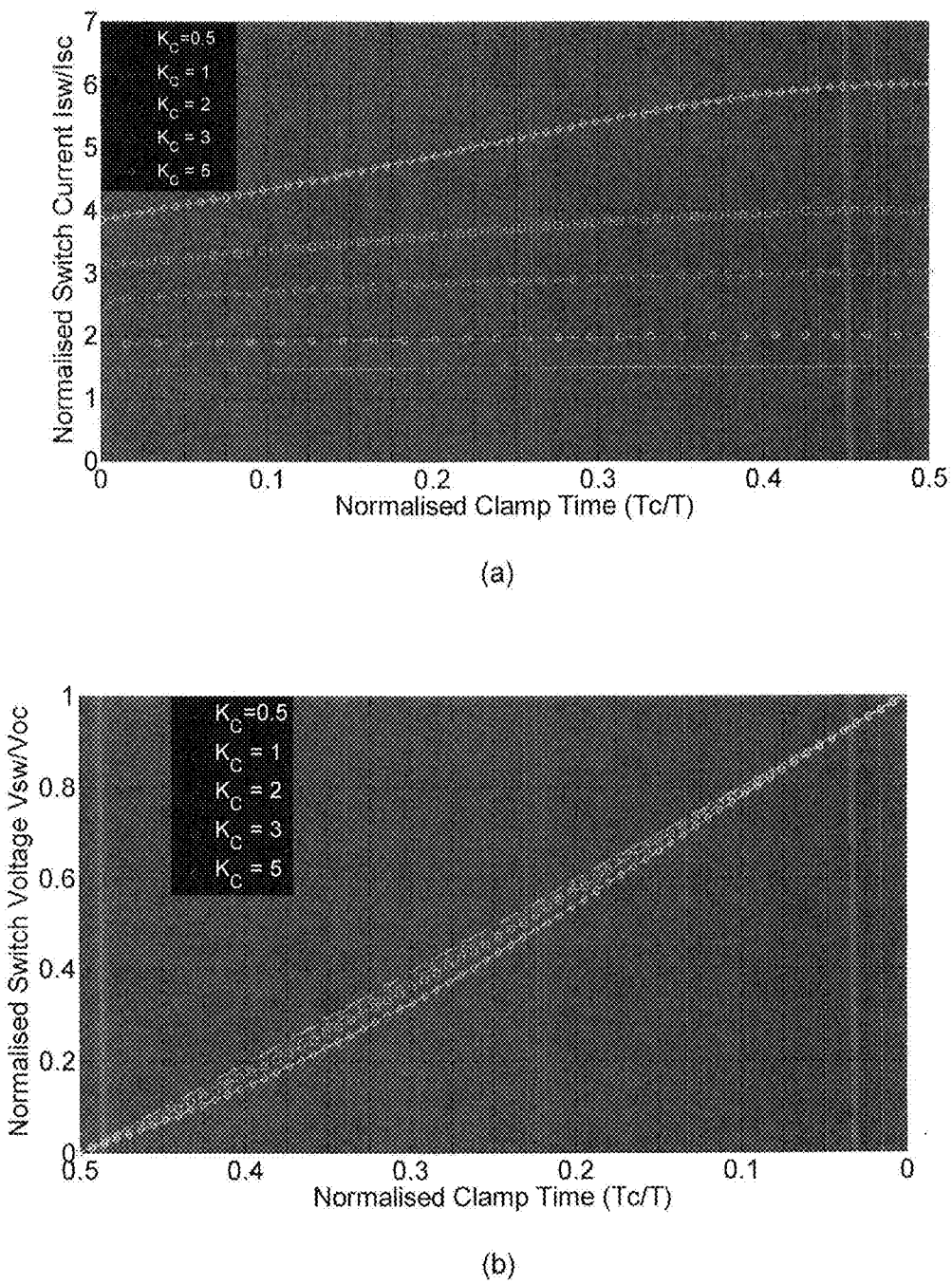
FIG. 15: Shows design conditions for the circuit of FIG. 12 with selection of capacitor ratio $K_c = C_3/C_2$ on (a) normalised switch current, (b) normalised switch voltage

By way of example, if a series tuned circuit is designed to power a stage light to meet the following specifications: f=20 kHz Pickup coil $P_{Su}=240$ VA, $P_o=1.2$ kW at 220V AC output using a pickup inductor L2=1.61 mM that has a Voc=220V, Isc=1.09 A, then using these specifications, it can be determined that $Q_2=5$. According to simulation, if $C_3=QC_2$, the $LI^2$ rating of inductor $L_3$ will be 3.6 times smaller than that of the pickup inductor coil, $L_2$. In consequence $L_3$ will have a volume ~3.6 times less than $L_2$. According to simulation, the results of which are shown in FIG. 14, the peak switch voltage will be 386V, and the peak switch current will be 9.5 A. Therefore, the total VA rating of the switch must be at least 3.7 kVA. In practice the ratio $K_c=C_2/C_3$ can be chosen to adjust the maximum switch current required under steady state operation as shown in FIG. 15(a), without affecting the switch voltage (FIG. 15(b)). IN RMS terms $I_{sw}=(k_c+1)I_{sc}$ however the peak switch current is $\hat{I}_{sw}=\sqrt{2}(K_c+1)I_{sc}$.

To meet the same parameters using the conventional series-tuned AC Processing pickup circuit of FIG. 2 the peak switch voltage would be at least $\sqrt{2}V_{cc}\sqrt{Q_2^2+1}=1.59$ kV. The switch current rating would need to be $>Q_2I_{sc}=5.45$ A. Therefore, the total VA rating of the switch must be at least 8.7 kVA, or 2.4 times higher than if the series-tuned resonant controller of FIG. 12 is used. Switches capable of blocking 1.59 kV while operating at the VLF frequencies as required for IPT applications are not usually practical, as such the standard series tuned AC processing circuit of FIG. 2 is not suited to meet the proposed specifications. However, as in the parallel tuned case, the series tuned resonant controller of FIG. 12 may be suitable. FIG. 12 operates at full power when the switch is off, whereas when the switch is on, the switch current is relatively small. Consequently the proposed pickup's efficiency should be higher than the standard series tuned AC Processing pickup of FIG. 2.

As with the proposed parallel-tuned resonant controller, there is a trade off between peak switch voltage and inductor $L_3$'s volume and cost. However, when using the series-tuned resonant controller topology for DC output as shown in the circuit of FIG. 13, several hundred volts output may be produced without requiring excessive switch blocking voltages. Because a DC inductor is not required to produce DC from the series tuned pickup, any additional size and cost in $L_3$ may be partially or completely offset by the lack of a DC inductor.

Minimising Transients in the Series Resonant Circuits

As stated above, the output voltage of FIG. 12 is perfectly sinusoidal, unlike that of the standard parallel tuned AC processing controller of FIG. 2. This means peak load voltages are lower for a given RMS value and RFI is reduced. Switch voltage oscillation and RFI is a particular problem for the standard series tuned AC processing circuit and needs to be addressed here as well. The turn off of the standard series tuned AC controller (FIG. 2) occurs when the body diode of the off-state switch reverse biases. At this point, the reverse recovery current of the diode starts to flow through the pickup inductor coil $L_2$ but rapidly falls to zero as the reverse recovery charge is depleted. This large $\delta i/\delta t$ through the pickup inductor causes a positive voltage spike across the blocking half of the AC switch. The voltage spike then induces high frequency oscillation in the switch blocking voltage $V_{DS}$ as the switch's capacitance $C_{DS}$ resonates with the pickup inductor. As well as creating EMI, this increases the peak voltage present across the switches significantly. A simple RC snubber across both of the switches can remedy this problem however the snubber's resistive losses reduce the pickup's efficiency.

Figure 16:
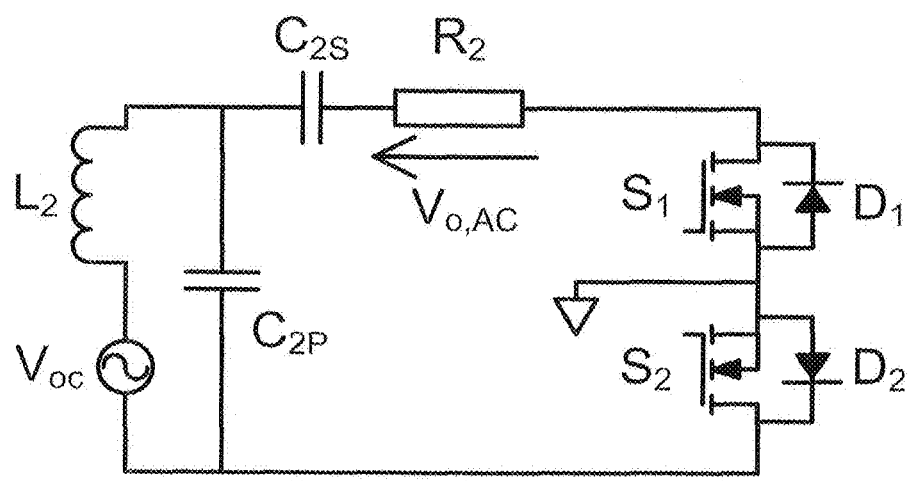
FIG. 16: Shows series tuned resonant circuits of FIGS. 2 and 12 can use partial parallel tuning capacitor via an additional $C_{2p}$ to minimise switch transients. Here it is shown applied to the circuit of FIG. 2.

A novel lossless approach is to parallel tune the pickup inductor with a marginal amount of voltage boost before the series tuning capacitor, as shown in FIG. 16. This gives the reverse recovery current a low impedance path across the pickup inductor coil, minimizing voltage spikes and oscillations as the AC switch turns off. Simulation has shown that this acts as an effective snubber by minimizing the peak switch voltages. The impedance of the proposed additional parallel compensation capacitor ($C_{2P}$) (which is non-resonant with the pick-up coil $L_2$ at the operation frequency when the AC switch is off i.e. open or inoperable) as used in simulation was set to $-10X_{L2}$, resulting in a voltage boost of 10%. In practice the addition of this capacitor changes the effective inductance of $L_2$ and this must be taken into account in the design of the other tuning components in the circuit. For a $C_{2P}=-10X_{L2}$, the effective new secondary inductance ($L_2'$) which takes into account the presence of $C_{2P}$ is $L_2'=1.1 L_2$.

The switch blocking voltage oscillation problem outlined here also applies to $L_3$ in the proposed series-tuned resonant controller of FIG. 12, however, the problem can also be mitigated by the use of the additional capacitor, allowing additional freedom in switch selection and consequently lower switch voltage and VA requirements.

Figure 17:
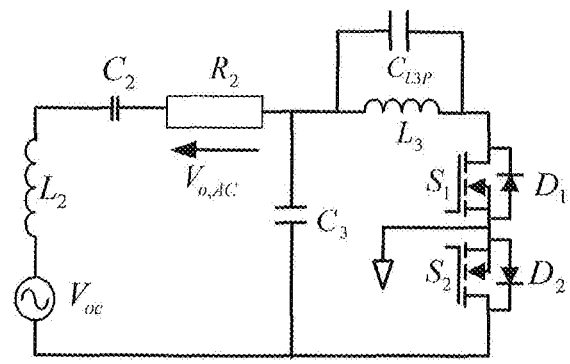
FIG. 17: Shows the circuit topology of FIG. 12 but including a non-resonant parallel capacitor for reducing peak switch voltages.
Figure 18:
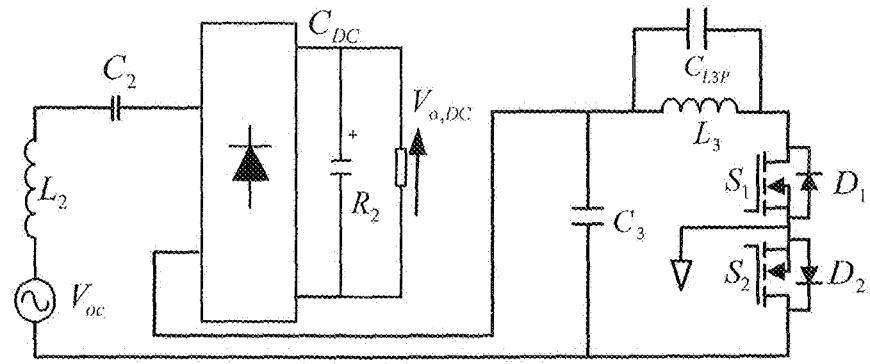
FIG. 18: Shows the circuit topology of FIG. 13 but including a non-resonant parallel capacitor for reducing peak switch voltages.

FIGS. 17 and 18 show the topologies of FIGS. 12 and 13 respectively, but with an additional compensation capacitor $C_{L3P}$ in parallel with inductor $L_3$. As described in the preceding paragraph, $C_{L3P}$ provides a path for the current through the inductor $L_3$ when the AC switch is opened and thus avoids the need for a snubber. For example, the non-resonant parallel capacitor $C_{L3P}$ may have a reactance that is approximately ten times that of the inductor $L_3$, so that the combined reactance of these parallel components is inductive and approximately 110% of the reactance of $L_3$.

From the foregoing it can be seen that the invention provides significant advantages in circuit control and efficiency and in minimising switch stresses. Furthermore, although the discussion above focuses on controlling the pick-up circuit using an AC switch in combination with one of more reactive elements to achieve a controlled variable reactive element, other configurations are possible. For example configurations which generate a variable reactance are also known within the field of inductive transfer, such as using a "saturable inductor/reactor" or switching a binary weighted capacitor tuning bank using relays for example. An inductor/capacitor tuning branch as described in this document could be applied to these other configurations as well, and may result in similar or the same advantages as when tuning the circuit with an AC switch.

Figure 19:
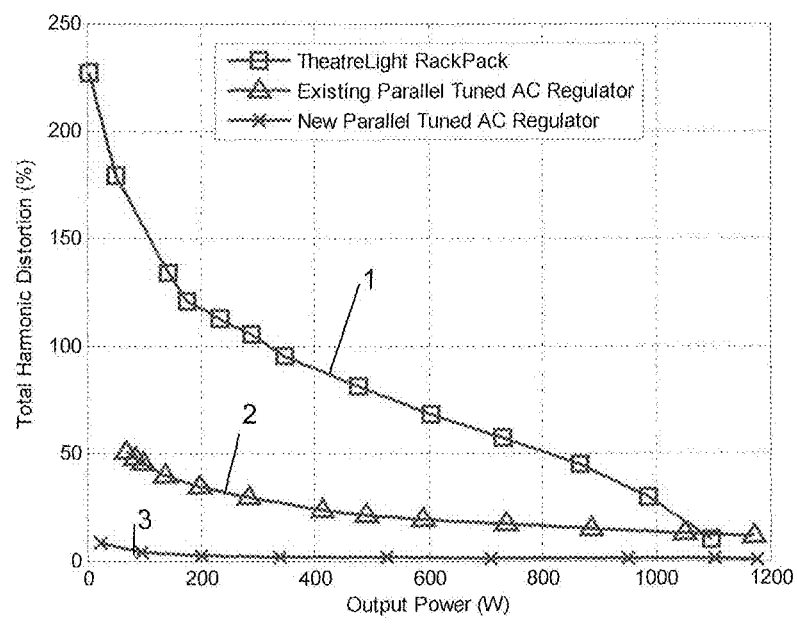
FIG. 19: Shows total harmonic distortion comparison between different parallel tuned AC regulators and a standard Commercial Dimmer for a lighting load.

The new circuits also considerably harmonic distortion across the load. An example is shown in FIG. 19 which shows the level of total harmonic distortion for given output power for a lighting load. Line 1 represents a standard commercial dimmer circuit. Line 2 represents use of a parallel tuned pick-up circuit using the topology of FIG. 1. Line 3, which shows a very low level of distortion, represents use of new the parallel tuned pick-up topology disclosed herein, such as that of FIG. 3.

Moreover, the person skilled in the art will appreciate that whereas the known circuit described in WO 2010/030195 reflects the capacitive load on the track, the circuits described in this document may reflect an inductive load onto the track. These reactive loads may be used to control tuning aspects of the overall IPT system. In one example, different pick-up circuit topologies may be used in separate pick-ups to achieve a desired result whereby the reflected reactances effectively tune each other out.

Those skilled in the art will also appreciate that, as with the circuit described in WO 2010/030195, the new circuits disclosed herein also allow the Q of the circuit to be controlled and/or fine tuned.

It will be seen from the foregoing that various changes to modifications to the presently preferred embodiments described in herein will be apparent to those skilled in the art. Such changes in modifications may be made without departing the spirit and scope of the present invention and without dimensioning its intended advantages. It is therefore, intended, that such changes and modifications be included within the present invention.

The invention claimed is:

1. An inductive power transfer (IPT) pick-up circuit for receiving power from a primary conductor at a selected operating frequency, the circuit comprising:
 a pick-up coil and a compensation capacitor;
 a switch controllable between an operable state and an inoperable state;
 a plurality of additional reactive elements whereby when the switch is in one of the operable or inoperable states the additional reactive elements are resonant at the selected operating frequency to substantially reduce or prevent power being supplied to an output of the pick-up circuit.

2. An IPT pick-up circuit as claimed in claim 1 wherein when the switch is in the other of the operable or inoperable states power is supplied to the load.

3. An IPT pick-up as claimed in claim 1 wherein when the switch is in the other of the operable or inoperable states the pick-up coil and compensation capacitor become resonant.

4. An IPT pick-up as claimed in claim 1 wherein when the switch is in the other of the operable or inoperable states the pick-up coil, compensation capacitor and at least one of the plurality of reactive elements are together resonant.

5. An IPT pick-up circuit as claimed in claim 1 wherein the pick-up coil and compensation capacitor are connected in parallel.

6. An IPT pick-up circuit as claimed in claim 5 wherein the output is provided in parallel with the compensation capacitor.

7. An IPT pick-up circuit as claimed in claim 5 wherein the plurality of additional reactive components comprise a capacitor and inductor connected in series.

8. An IPT pick-up circuit as claimed in claim 7 wherein the series connected capacitor and inductor are connected in parallel with the pick-up coil and compensation capacitor.

9. An IPT pick-up circuit as claimed in claim 8 wherein the switch is connected in parallel with the capacitor.

10. An IPT pick-up circuit as claimed in claim 1 wherein the pick-up coil and compensation capacitor are arranged in series.

11. An IPT pick-up circuit as claimed in claim 10 wherein the output is provided in series with the compensation capacitor.

12. An IPT pick-up circuit as claimed in claim 10 wherein the plurality of additional reactive components comprise a capacitor and inductor connected in parallel.

13. An IPT pick-up circuit as claimed in claim 12 wherein the parallel connected capacitor and inductor are connected in series with the pick-up coil and compensation capacitor.

14. A method in controlling an inductive power transfer (IPT) pick-up circuit having a pick-up coil and a compensation capacitor, the method comprising:

operating a switch to cause one or more additional reactive components to become resonant to thereby control power supply to a load; and disposing the switch in one of an operable or inoperable state to cause the reactive elements to be resonant to substantially prevent power being supplied to an output of the pick-up circuit.

15. A method as claimed in claim 14 further comprising disposing the switch in the other operable or inoperable state to control power to the load.

16. A method as claimed in claim 15 further comprising disposing the switch in the other of the operable or inoperable states to cause the pick-up coil and compensation capacitor to become resonant to supply power to the load.

* * * * *